A. R. MURRAY.
SPRING SWITCH.
APPLICATION FILED MAY 12, 1908.
946,391.
Patented Jan. 11, 1910.
2 SHEETS—SHEET 1.
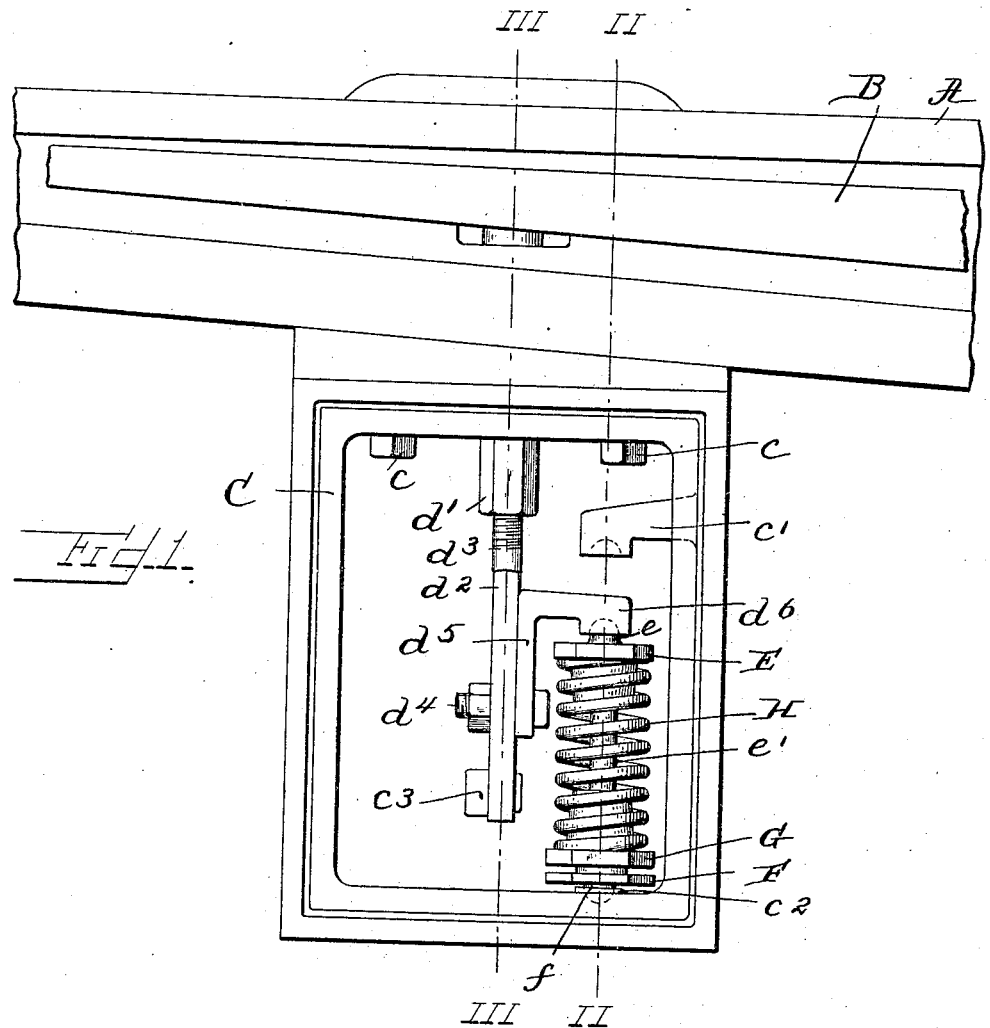
WITNESSES:
Leo Conrad.
L. O'Connell
INVENTOR
A. R. Murray
BY
Jesse B. Heller
ATTORNEY.

A. R. MURRAY.
SPRING SWITCH.
APPLICATION FILED MAY 12, 1908.
946,391
Patented Jan. 11, 1910.
2 SHEETS—SHEET 2.
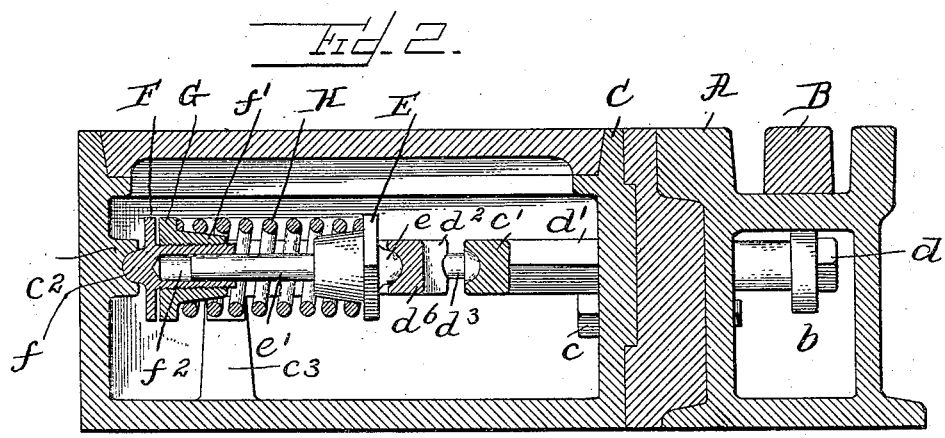
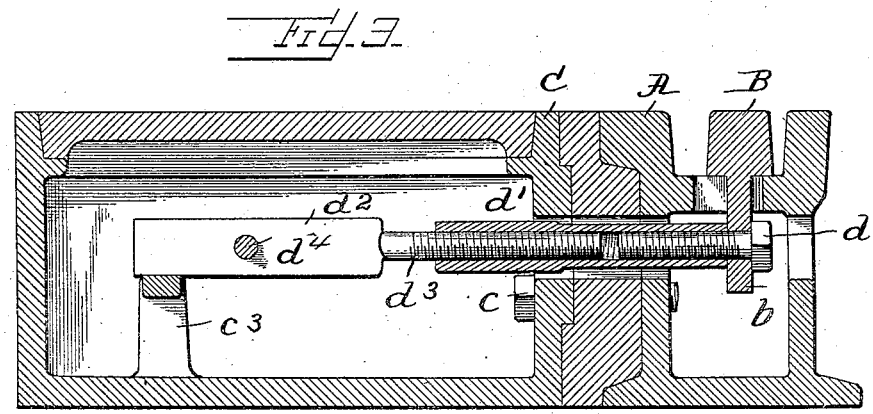
WITNESSES:
Leo Conrad.
L. O'Connell
INVENTOR
A. R. Murray,
BY
Jesse B. Heller.
ATTORNEY.

UNITED STATES PATENT OFFICE.

ARCHIE R. MURRAY, OF JOHNSTOWN, PENNSYLVANIA, ASSIGNOR TO THE LORAIN STEEL COMPANY, A CORPORATION OF PENNSYLVANIA.

SPRING-SWITCH.

946,391.

Specification of Letters Patent.

Patented Jan. 11, 1910.

Application filed May 12, 1908. Serial No. 432,525.

*To all whom it may concern:*

Be it known that I, ARCHIE ROLFE MURRAY, of Johnstown, in the county of Cambria and State of Pennsylvania, have invented a new and useful Improvement in Spring-Switches, of which the following is a full, clear, and exact description, reference being had to the accompanying drawings, which form a part of this specification.

My invention has relation to certain new and useful improvements in spring switches whereby a switch may be readily used as a spring switch for either a right or left hand throw.

With this object in view, my invention consists in the novel construction, arrangement, and combination of parts, all substantially as hereinafter described and pointed out in the appended claims, reference being had to the accompanying drawings, in which—

Figure 1, is a plan view of a portion of a switch structure and attached spring box with the cover removed. Figs. 2 and 3 are sectional views on the lines II—III and III—III respectively of Fig. 1.

A is the switch structure in which is pivoted the tongue B which is provided with a projection $b$.

C is a spring box which is secured to the switch structure by means of the bolts or screws $c$. Formed integrally with this box C, or secured thereto, are the projections $c'$, $c^2$, and $c^3$. The projections $c'$ and $c^2$ are provided with a semicircular cavity, and the projection $c^3$ is provided with an angular face for the purpose hereinafter described.

Passing through the projection $b$ of the tongue B, is the screw $d$, which is provided with a tubular nut $d'$.

$d^2$, is a rod having the thread portion $d^3$, which enters the tubular nut $d'$, the rectangular portion of this rod $d^2$ resting on the angular face of the projection $c^3$. Pivotally connected to the rod $d^2$, by means of the bolt $d^4$, is the member $d^5$, having a right angle projection $d^6$, which is provided with a semicircular orifice similar to the semi-circular orifices in the projections $c'$ and $c^2$. Resting in the recess of the angle portion $d^6$, of the member $d^5$, is a semi-spherical head $e$ of the member E. This member E, is also provided with a projecting rod $e'$. Resting in the recess of the projection $c^2$, is the semi-spherical head $f$ of the member F. This member F is also provided with a screw threaded portion $f'$ which is provided with the orifice $f^2$, into which the member $e'$ of the member E projects. Surrounding the screw portion $f'$ of the member F, is the flange nut G, and interposed between this nut G and the flange of the member E, is the spring H.

As will readily be seen by reference to the accompanying drawings, the switch tongue is set so that all cars will take the curve, the spring exerting a pressure against the projection $c^2$, and rod $d^2$, through the medium of the member $d^5$. If the throw of this tongue is to be changed, so that all cars will take the straight track, the spring with its various members is removed from between the projection $c^2$ and the member $d^5$. The member $d^5$ is rotated 180°, and the spring is then interposed between the projection $c'$ and the member $d^5$, so that the tongue will normally be held in the opposite position.

The tension of the spring H may be increased or decreased by moving the nut G in the thread portion $f'$ of the member F.

The advantages of my invention result mainly from the provision of the reversible spring bearing member attached to the tongue, its connection with the fixed spring bearings being arranged so that the spring can be readily and quickly changed from one position to the other, and its action on the tongue reversed.

I do not wish to limit myself to the detail construction shown and described, as various changes can be made without departing from the spirit and scope of my invention.

Having thus described my invention, what I claim as new, and desire to secure by Letters Patent, is:—

1. In a switch structure, a pivoted tongue, a rod secured to said tongue, an invertible member pivoted to said rod, and a spring interposed between the invertible member and a fixed bearing.

2. In a switch structure, a movable tongue having a rod secured thereto, a reversible angular spring bearing pivoted to said rod, a spring box having two fixed bearings and a spring which is interposed between one of the fixed bearings and the reversible member.

3. In a switch structure, a movable tongue having a rod secured thereto, an angular member pivoted to said rod, a spring box having two fixed bearings, a spring which is interposed between one of the fixed bearings and the member pivoted to the switch rod, and means to adjust the tension of said spring.

4. In a switch structure, a pivoted switch tongue, a reversible spring bearing pivoted thereto, and two fixed spring bearings in line with the reversible bearing, and at opposite sides thereof, and a spring interposed between the reversible bearing and one of the fixed bearings.

In testimony whereof I have affixed my signature in presence of two witnesses.

A. R. MURRAY.

Witnesses:
 L. O'CONNELL,
 H. W. SMITH.